(12) United States Patent
Gazsi et al.

(10) Patent No.: US 7,079,538 B2
(45) Date of Patent: Jul. 18, 2006

(54) HIGH-SPEED ROUTER

(75) Inventors: Lajos Gazsi, Duesseldorf (DE); Xiaoning Nie, Munich (DE)

(73) Assignee: Infineon Technologies AG, Munich (DE)

( * ) Notice: Subject to any disclaimer, the term of this patent is extended or adjusted under 35 U.S.C. 154(b) by 877 days.

(21) Appl. No.: 09/803,384

(22) Filed: Mar. 9, 2001

(65) Prior Publication Data

US 2001/0030961 A1    Oct. 18, 2001

(30) Foreign Application Priority Data

Mar. 10, 2000  (DE) ................ 100 11 667

(51) Int. Cl.
*H04L 12/28* (2006.01)
*H04J 3/24* (2006.01)

(52) U.S. Cl. ...................... 370/392; 370/474
(58) Field of Classification Search ........ 370/389–392, 370/401, 474
See application file for complete search history.

(56) References Cited

U.S. PATENT DOCUMENTS

| | | | | |
|---|---|---|---|---|
| 5,278,830 A | * | 1/1994 | Kudo ..................... | 37/232 |
| 5,513,134 A | * | 4/1996 | Cooperman et al. ......... | 365/49 |
| 5,619,497 A | * | 4/1997 | Gallagher et al. .......... | 370/394 |
| 5,721,833 A | * | 2/1998 | Cooperman et al. ......... | 710/56 |
| 5,974,409 A | * | 10/1999 | Sanu et al. ................. | 707/3 |
| 5,978,844 A | * | 11/1999 | Tsuchiya et al. ........... | 709/221 |
| 5,991,299 A | * | 11/1999 | Radogna et al. ........... | 370/392 |
| 6,032,190 A | * | 2/2000 | Bremer et al. ............. | 709/238 |
| 6,160,811 A | * | 12/2000 | Partridge et al. ........... | 370/401 |
| 6,252,878 B1 | * | 6/2001 | Locklear et al. ............ | 370/401 |
| 6,424,659 B1 | * | 7/2002 | Viswanadham et al. .... | 370/469 |
| 6,480,489 B1 | * | 11/2002 | Muller et al. .............. | 370/389 |
| 6,483,804 B1 | * | 11/2002 | Muller et al. .............. | 370/230 |
| 6,650,640 B1 | * | 11/2003 | Muller et al. .............. | 370/392 |
| 6,700,888 B1 | * | 3/2004 | Jonsson et al. ............ | 370/392 |
| 6,711,153 B1 | * | 3/2004 | Hebb et al. ................ | 370/351 |
| 6,721,309 B1 | * | 4/2004 | Stone et al. ................ | 370/362 |
| 6,747,972 B1 | * | 6/2004 | Lenoski et al. ............. | 370/394 |

FOREIGN PATENT DOCUMENTS

| | | |
|---|---|---|
| JP | 9275413 | 10/1997 |
| WO | WO 99/17182 | 4/1999 |

* cited by examiner

*Primary Examiner*—Chau Nguyen
*Assistant Examiner*—Hong Sol Cho
(74) *Attorney, Agent, or Firm*—Fish & Richardson P.C.

(57) ABSTRACT

High-speed router for transmitting data packets, containing header data and useful data, between data networks, the router including a plurality of data processing processors for parallel data processing of the header data, a demultiplexer for separating the data packets into header data and useful data, and a distribution processor for distributing the separated header data among the data processing processors. The distribution processor distributes the header data at least in part on the basis of a priority specified by the header data and the workload of the data processing processors.

18 Claims, 3 Drawing Sheets

HIGH-SPEED ROUTER

The invention relates to a high-speed router for transmitting data packets between data networks.

BACKGROUND OF THE INVENTION

Data networks are used for interchanging data organized in the form of data packets. Identical types of data networks are connected to one another by so-called bridges, while different types of data networks require so-called coupling computers or gateways. In large data networks of the same type coupled to one another, the data paths are stipulated by so-called routers. A router is a linking computer between two data networks. It forms part of the three bottommost layers in the OSI layer model and controls which path a data packet which is to be transmitted will take. Unlike bridges, routers have a dedicated MAC address, so that they behave toward stations as though they themselves are communicating parties. Routers are networked with one another and regularly exchange information about configurations, line items, number of routers in the data path, error rates and bit rate capacity with one another using a routing protocol. The routers exchange this information using particular protocols, with multiprotocol routers being standard today, that is to say routers which are able to process various protocols. The performance coefficient of a router is the throughput of the router, which is indicated either in data packets/second or in bytes/second. In addition, the performance of a router depends on the processing time for a data packet and on the time between the data processing for two data packets. Both add up to form the time spent by a data packet in the router.

Data packets comprise header data or a header, useful data (the so-called payload) and terminal data or a trailer. The header or the header data contains various administration data for the data packet, for example address, data packet number, transmitter identification, data packet status etc. The useful data contain the actual information which is to be transmitted.

A conventional router permits the transmission of data between various fast Internet data networks, such as OC-12 or OC-48 interfaces. OC-12 has a data transmission rate of 622 Mbits/second, and OC-48 has a data transmission rate of 2.5 Gbits/second. For bidirectional connections, an OC-48 interface results in a data throughput of 5.0 Gbits/second. These extremely high data transmission speeds place high demands on the production of the data transmission routers.

FIG. 1 shows the basic design of a conventional router based on the prior art. The router connects a first local area data network LAN1 to a second local area network LAN2. The router is connected to the data networks by means of data processing blocks in the physical layer. The physical data processing blocks are used for setting up, maintaining and restoring physical data connections, for coding/decoding, for synchronizing and regenerating the transmission clock and for the so-called smoothing functions. The physical data processing blocks PHY extract the data bits from the data stream arriving via the analog lines, or output them to said analog lines. The physical data processing blocks PHY are respectively connected to a line card. A line card respectively contains an input/output port IO and a data forwarding circuit DW. The two line cards of the router are connected to a switch or to a switching mechanism S.

FIG. 2 shows a data path within a line card of a conventional router based on the prior art. The applied data packet is routed through the entire data path. First, the data packet enters an input buffer, in which it is buffer-stored. Header data processing, the data processing of the data contained in the header of the data packet, then takes place. The data packet is forwarded and switched and finally enters an output buffer. So-called scheduling then takes place in a scheduler in a further step. The isolated data processing units, i.e. the header data distribution unit, the forwarding circuit and the scheduler need to operate quickly enough to prevent the buffer memory from overflowing. These units are therefore conventionally implemented in the form of application specific integrated circuits, so-called ASICs.

The Internet is distinguished by a high level of growth and flexibility. In particular, Internet services like security, quality of service QOS and traffic engineering are subject to various configurations and modifications. Conventional routers, whose processing units are implemented in the form of ASICs, have the disadvantage that they are inflexible for configuration changes, since their hardware is stipulated. Routers have therefore been proposed which are programmable and contain processors. Since the data processing speed of an individual processor cannot keep up with the transmission speed of normal data transmission networks, multiprocessor routers having a plurality of processors and a pipeline architecture have been proposed.

FIG. 3 shows such a conventional multiprocessor router with pipeline architecture based on the prior art. In this case, the router contains a plurality of processors P1–P4, each assigned specific tasks. In this context, by way of example, the three series-connected processors P1–P3 perform various data processing tasks for header data, and the processor P4 performs the scheduling.

Although such multiprocessor routers result in an increase in the data processing speed, they have the disadvantage that various different processors P1–P4 need to be programmed for the different tasks. Furthermore, testing such conventional multiprocessor routers becomes much more difficult on account of the use of processors programmed in various different ways.

SUMMARY OF THE INVENTION

It is therefore the object of the present invention to provide a high-speed router which is easy to program and to test and at the same time permits a very high data transmission speed.

This object is achieved by a high-speed router having the features specified in patent claim 1.

The invention provides a high-speed router for transmitting data packets, containing header and useful data, between data networks, the router having a plurality of data processing processors for parallel data processing of the header data.

The high-speed router preferably has a demultiplexer for separating the data packets which are present into header data and useful data.

Preferably, a distribution processor is provided for distributing the separated header data to the various data processing processors.

The distribution processor distributes the header data preferably on the basis of the priority of the header data and the workload of the data processing processors.

In this context, the header data are distributed to the data processing processors preferably by means of a DMA operation.

In another preferred embodiment, a CAM coprocessor having an associative memory is provided for classifying the data packets.

Preferably, a useful data memory is also provided for buffer-storing the separated useful data.

In this context, the header data and useful data in a data packet preferably contain a respective identifier.

In addition, a first multiplexer is preferably provided for compiling the processed header data and the useful data, the useful data coming from the useful data memory or from a switching mechanism.

In addition, a second multiplexer is preferably provided for compiling the useful data buffer-stored in useful data memory and the processed header data.

In one preferred embodiment of the high-speed router according to the invention, the first multiplexer has a FIFO memory connected downstream of it for outputting the compiled data packets through the router.

The output of the second multiplexer is preferably connected to the switching mechanism.

In one particularly preferred embodiment, the distribution processor, data processing processors and the CAM coprocessor are connected to a common header data bus.

Each data processing processor preferably has a dedicated local memory.

In addition, a common global memory is preferably connected to the header data bus.

In one particularly preferred embodiment, the CAM coprocessor is connected to the header data bus via FIFO buffer memories.

The demultiplexer preferably has an input buffer connected upstream of it.

In this context, the data networks are preferably LAN networks or the Internet.

The distribution processor and the data processing processors are preferably of the same processor type.

A preferred embodiment of the high-speed router according to the invention is described below with reference to the appended figures in order to explain features which are fundamental to the invention.

DETAILED DESCRIPTION OF THE DRAWINGS

Figure 1:
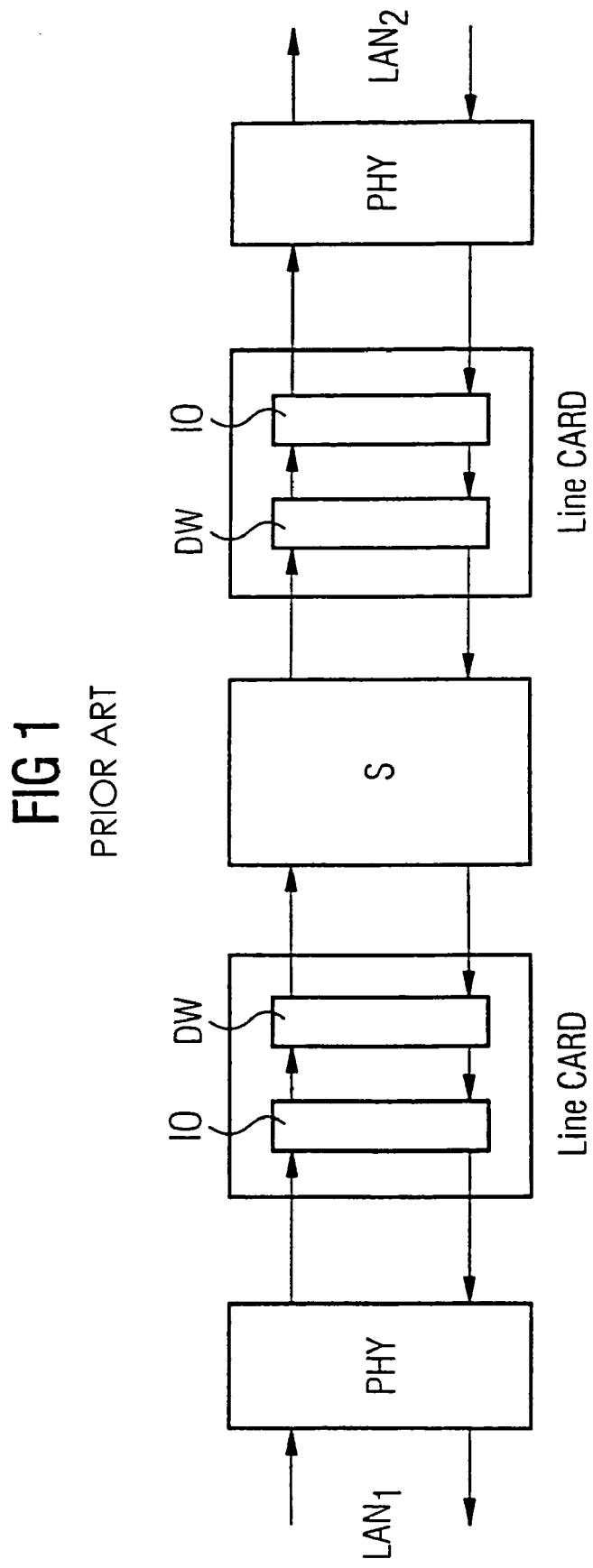
FIG. 1 shows the basic design of a conventional router based on the prior art.
Figure 2:
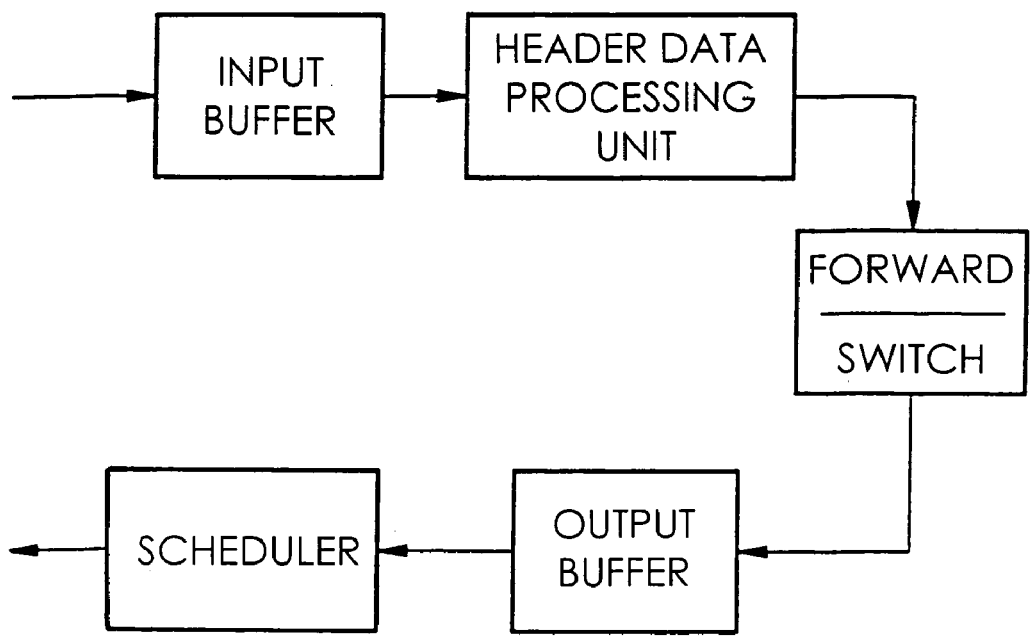
FIG. 2 shows a data path within a line card based on the prior art.
Figure 3:
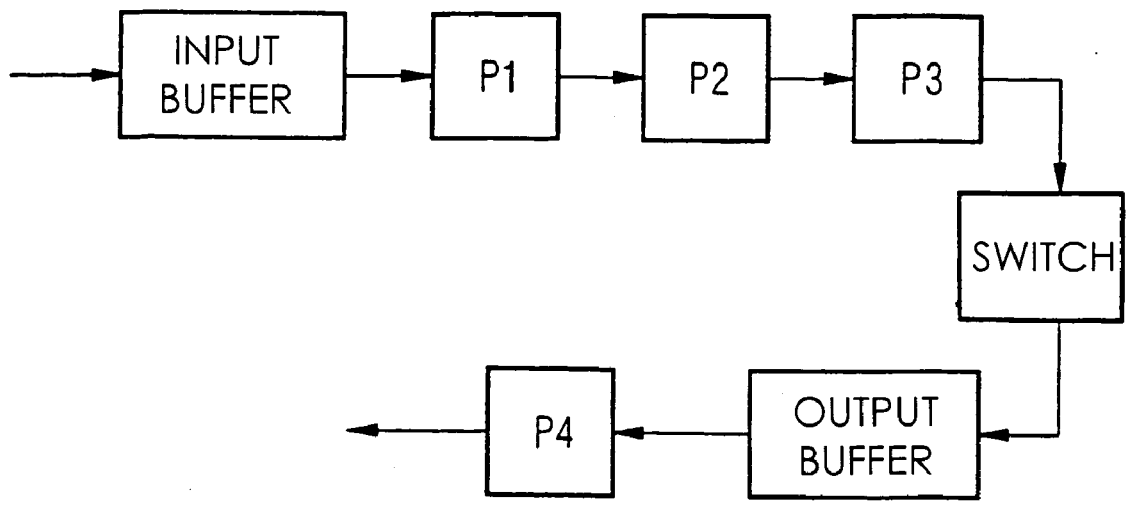
FIG. 3 shows a multiprocessor router with pipeline architecture based on the prior art.
Figure 4:
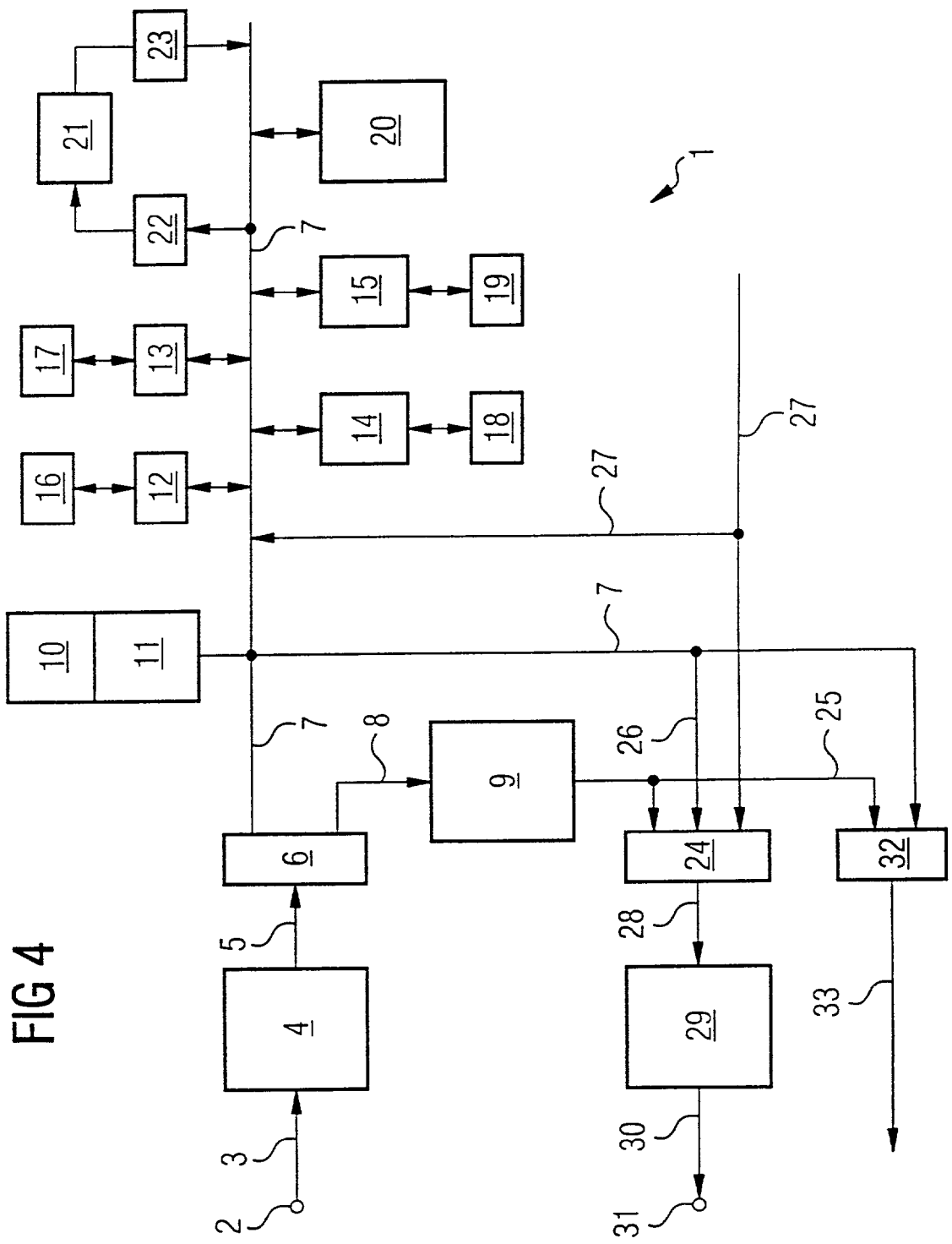
FIG. 4 shows a preferred embodiment of the high-speed router according to the invention.

FIG. 4 shows the design of a preferred embodiment of the high-speed router 1 according to the invention. The high-speed router 1 has a data input connection 2 via which the router 1 receives data packets serially. The data packets contain a header or header data and also a payload or useful data. The data packets enter an input buffer 4, via a line 3, for buffer-storing the incoming data packets. From the input buffer 4, the data packets are routed via a line 5 to a demultiplexer 6, which separates the header data from the useful data. The header data are switched onto a header data bus 7 by the demultiplexer 6, while the useful data are written to a useful data memory 9 by the demultiplexer 6 via a line 8. The useful data memory 9 is preferably a RAM memory.

Connected to the header data bus 7 is a distribution processor 10 having a DMA device 11. The distribution processor 10 is used for distributing the header data present on the header data bus 7 to various data processing processors 12, 13, 14, 15 arranged in parallel. The data processing processors 12, 13, 14, 15 are preferably of the same processor type and each have a dedicated local memory 16, 17, 18, 19. In this case, the local memories are preferably RAM memories. The incoming header data are distributed to the various data processing processors 12, 13, 14, 15 by means of DMA operation. The distribution processor 10 distributes the header data on the basis of the priority of the header data and the workload of the data processing processors 12, 13, 14, 15.

In addition, a common memory 20 which can be accessed by all the data processing processors 12, 13, 14, 15 is provided on the header data bus 7. Furthermore, the router 1 according to the invention contains a CAM coprocessor 21 having an associative memory or a CAM memory. The CAM coprocessor is used for classifying the data packets. In this case, the CAM coprocessor is connected via FIFO memories 22, 23 to the header data bus 7 in order to smooth the flow of data.

In addition, the router 1 according to the invention contains a first multiplexer 24 for compiling the header data present on the header data bus 7 and the associated useful data buffer-stored in the useful data memory 9. To this end, the header data and useful data of an incoming data packet have an identifier or identification ID indicating to which data packet they belong. The first multiplexer 24 is connected to the useful data memory 9 via a line 25 and to the header data bus 7 via a line 26. In addition, the multiplexer is connected to a switching mechanism or switch fabric via a line 27. The output of the first multiplexer 24 is connected via a line 28 to a FIFO output memory 29, which is used for outputting the compiled data packets via a line 30 and an output connection 31 of the router 1.

In addition, the router 1 contains a second multiplexer 32, whose input is connected via lines 25 to the useful data memory 9 and to the header data bus 7. The output of the second multiplexer 32 is connected to the switching mechanism via a line 33.

The inventive high-speed router 1 shown in FIG. 4 permits the data transmission of data packets at a very high data transmission speed, the various processors being able to be of the same processor type on account of the parallel architectures, and the same software tools being able to be used for the various processors. Each incoming data packet is treated as a stateless data unit, with just the header data being processed by the router 1.

One advantage of the router architecture shown in FIG. 4 is that output buffering becomes superfluous. Only the header data are buffered both at the input and at the output. In this context, the header data are buffer-stored at the input until classification has ended and a decision has been made regarding the destination to which the header data and the associated useful data need to be forwarded. The output port is responsible for the scheduling and indicates to what location and when a data packet is written to the output FIFO buffer for data transmission. The control information can be transmitted by means of the switching mechanism or the switch fabric.

The router architecture shown in FIG. 4 can be used for various types of routers and switches, in particular for so-called edge routers, core routers, server routers and ATM switches.

The parallel arrangement of a plurality of processors on the common header data bus 7 means that the high-speed router 1 according to the invention achieves an extremely high data transmission speed while at the same time being easy to program and test.

The invention claimed is:

1. A high-speed router for transmitting data packets containing header data and useful data between data networks, the router comprising:
    a plurality of data-processing processors for parallel data processing of the header data;
    a demultiplexer for separating the data packets into header data and useful data; and
    a distribution processor for distributing the header data, which has been separated from the useful data, among the data-processing processors at least in part on the basis of a priority specified by the header data and a workload of the data-processing processors.

2. The high-speed router as claimed in claim 1, wherein the distribution processor is configured to distribute the header data among the data-processing processors by means of DMA operations.

3. The high-speed router as claimed in claim 1, further comprising a CAM coprocessor having an associative memory for classifying the data packets.

4. The high-speed router as claimed in claim 3, wherein the distribution processor, the data-processing processors and the CAM coprocessor are connected to a common header-data bus.

5. The high-speed router as claimed in claim 4, further comprising a common memory connected to the header-data bus.

6. The high-speed router as claimed in claim 4, wherein the CAM coprocessor is connected to the header data bus via FIFO buffer memories.

7. The high-speed router as claimed in claim 1, further comprising a useful-data memory for buffer-storing the separated useful data.

8. The high-speed router as claimed in claim 7, further comprising a first multiplexer for compiling header data and useful data into data packets, the first multiplexer being configured to accept useful data from at least one of the useful-data memory and a switching mechanism.

9. The high-speed router as claimed in claim 8, further comprising a second multiplexer for compiling the buffer-stored separated useful data in the useful data memory and the header data.

10. The high-speed router as claimed in claim 9, wherein the output of the second multiplexer is connected to the switching mechanism.

11. The high-speed router as claimed in claim 8, further comprising a FIFO memory connected downstream of the first multiplexer for outputting the compiled data packets through the router.

12. The high-speed router as claimed in claim 1, wherein header data and useful data corresponding to a data packet each have a respective identifier associated with the corresponding data packet.

13. The high-speed router as claimed in claim 1, wherein each data-processing processor is connected to a respective dedicated local memory.

14. The high-speed router as claimed in claim 1, further comprising an input buffer connected upstream of the demultiplexer.

15. The high-speed router as claimed in claim 1, configured to transmit data packets between a first data network and a second data network, the first data network comprising a LAN network.

16. The high-speed router as claimed in claim 1, configured to transmit data packets between a first data network and a second data network, the second data network comprising the Internet.

17. The high-speed router as claimed in claim 1, wherein the distribution processor and the data-processing processors are processors of the same processor type.

18. A system comprising
    a first data network; and
    a high-speed router as recited in claim 1, the high-speed router being configured to transmit data packets between the first data network and a second data network.

* * * * *